(12) United States Patent
Wang et al.

(10) Patent No.: US 11,540,337 B2
(45) Date of Patent: Dec. 27, 2022

(54) SESSION HANDLING METHOD AND APPARATUS

(71) Applicant: Huawei Technologies Co., Ltd., Shenzhen (CN)

(72) Inventors: Yuan Wang, Shanghai (CN); Zhongping Chen, Shanghai (CN); Changchun Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/791,775

(22) Filed: Feb. 14, 2020

(65) Prior Publication Data

US 2020/0187276 A1 Jun. 11, 2020

Related U.S. Application Data

(63) Continuation of application No. PCT/CN2018/100641, filed on Aug. 15, 2018.

(30) Foreign Application Priority Data

Aug. 15, 2017 (CN) .......................... 201710698731.1

(51) Int. Cl.
*H04W 76/11* (2018.01)
*H04L 67/146* (2022.01)
(Continued)

(52) U.S. Cl.
CPC .......... *H04W 76/11* (2018.02); *H04L 67/146* (2013.01); *H04L 69/322* (2013.01); *H04W 8/08* (2013.01);
(Continued)

(58) Field of Classification Search
CPC ... H04W 76/11; H04W 8/08; H04W 36/0027; H04W 40/02; H04W 80/02; H04W 76/10; H04L 67/146; H04L 69/322
See application file for complete search history.

(56) References Cited

U.S. PATENT DOCUMENTS

| 2018/0279180 A1* | 9/2018 | Lee .......................... H04L 67/14 |
| 2020/0178196 A1 | 6/2020 | Wang et al. |
| 2020/0221376 A1 | 7/2020 | Li et al. |

FOREIGN PATENT DOCUMENTS

| CN | 101316194 A | 12/2008 |
| CN | 102355652 A | 2/2012 |

(Continued)

OTHER PUBLICATIONS

3rd Generation Partnership Project; Technical Specification Group Services and System Aspects; Procedures for the 5G System; Stage 23GPP TS 23.502 V0.5.0 (Jul. 2017) (Year: 2017).*
(Continued)

Primary Examiner — Shailendra Kumar
(74) Attorney, Agent, or Firm — Conley Rose, P.C.

(57) ABSTRACT

A session handling method and apparatus, where the method includes: initiating, by a terminal, an application (APP); determining a session type of a packet data unit (PDU) session based on the APP; and sending a first message to an access and mobility management function (AMF) entity, where the first message includes the session type, and the first message is used to request to establish the PDU session of the session type. In the method, a network side can establish the PDU session of the corresponding type based on the session type of the PDU session that is sent by the terminal, in order to establish the PDU session of the correct type for the terminal.

20 Claims, 4 Drawing Sheets

(51) Int. Cl.
*H04W 8/08* (2009.01)
*H04W 36/00* (2009.01)
*H04W 40/02* (2009.01)
*H04W 80/02* (2009.01)
*H04L 69/322* (2022.01)

(52) U.S. Cl.
CPC ....... *H04W 36/0027* (2013.01); *H04W 40/02* (2013.01); *H04W 80/02* (2013.01)

(56) References Cited

FOREIGN PATENT DOCUMENTS

| EP | 3668006 A1 | 6/2020 | | |
|---|---|---|---|---|
| RU | 2484592 C2 | 6/2013 | | |
| WO | 2013072403 A1 | 5/2013 | | |
| WO | WO-2013072403 A1 * | 5/2013 | ............ | H04W 48/17 |
| WO | 2019028837 A1 | 2/2019 | | |
| WO | 2019032972 A1 | 2/2019 | | |

OTHER PUBLICATIONS

3rd Generation Partnership Project; Techical Specification Group Services and System Aspects; System Architecture for the 5G System; Stage 2; 3GPP TS 23.501 V1.1.0 (Jul. 2017) (Year: 2017).*

Ericsson, Solution updates to MM-SM split, 3GPP SA WG2 Meeting #117, Oct. 17-21, 2016, Kaohsiung City, Taiwan; S2-165557 (Year: 2016).*

Samsung, 23.501: Update of UE Route Selection Policy, SA WG2 Meeting #120, Mar. 27-31, 2017, Busan, South Korea, S2-172122 (Year: 2017).*

"3rd Generation Partnership Project; Technical Specification Group Services and System Aspects; System Architecture for the 5G System; Stage 2 (Release 15)," 3GPP TS 23.501, V0.2.0, Jan. 2017, 25 pages.

"3rd Generation Partnership Project; Technical Specification Group Services and System Aspects; Procedures for the 5G System; Stage 2 (Release 15)," 3GPP TS 23.502, V0.5.0, Jul. 2017, 148 pages.

Ericsson, "Solution updates to MM-SM split," Sa WG2 Meeting #117; S2-165557, XP051155144, Oct. 17-21, 2016, Kaohsiung City, Taiwan, 8 pages.

"3rd Generation Partnership Project; Technical Specification Group Services and System Aspects; System Architecture for the 5G System; Stage 2 (Release 15)," 3GPP TS 23.501 V1.0.0 (Jun. 2017), 145 pages.

"Samsung, 23. 501: Update of UE Route Selection Policy," SA WG2, Meeting #120 S2-172122, 4 pages.

SA WG2 Meeting #120, S2-172501, "23.501: Updates on UE Route Selection Policy," Motorola Mobility, Lenovo, Broadcom, Mar. 26-31, 2017, Busan, South Korea, 6 pages.

3GPP TS 23.502 V0.2.0, Feb. 2017 "3rd Generation Partnership Project; Technical Specification Group Services and System Aspects; Procedures for the 5G System; Stage 2 (Release 15)," 71 pages.

* cited by examiner

SESSION HANDLING METHOD AND APPARATUS

CROSS-REFERENCE TO RELATED APPLICATIONS

This application is a continuation of International Patent Application No. PCT/CN2018/100641, filed on Aug. 15, 2018, which claims priority to Chinese Patent Application No. 201710698731.1, filed Aug. 15, 2017. All of the aforementioned patent applications are hereby incorporated by reference in their entireties.

TECHNICAL FIELD

This application relates to the field of mobile communications technologies, and in particular, to a session handling method and apparatus.

BACKGROUND

In fifth generation (5G) mobile communication, a plurality of types of packet data unit (PDU) sessions are defined, for example, an Internet type session, an Ethernet type session, and an unstructured type session.

When there are a plurality of types of PDU sessions, how to establish a PDU session of a correct type for a terminal is a problem to be resolved.

SUMMARY

This application provides a session handling method and apparatus to establish a PDU session of a correct type for a terminal.

To achieve the foregoing objective, this application provides following technical solutions.

According to a first aspect, this application provides a session handling method, including: initiating, by a terminal, an application (APP); determining a session type of a packet data unit (PDU) session based on the APP; and sending, by the terminal, a first message to an access and mobility management function (AMF) entity, where the first message includes the session type, and the first message is used to request to establish the PDU session of the session type. In the method, when initiating, to the AMF entity, the first message used to request to establish the PDU session, the terminal adds the session type of the PDU session to the first message, such that a network side can establish the PDU session of the corresponding type based on the session type of the PDU session that is sent by the terminal, in order to establish the PDU session of the correct type for the terminal, thereby improving correctness of communication between the terminal and the network side.

In a possible design, determining, by a terminal, a session type of a PDU session includes determining, by the terminal based on a first correspondence, the session type corresponding to the APP, where the first correspondence is a correspondence between an APP and a session type of a PDU session. In the method, the terminal determines the session type of the PDU session based on the correspondence between an APP and a session type of a PDU session. This is easy to implement.

In a possible design, the first correspondence is preconfigured on the terminal. Alternatively, the first correspondence is obtained by the terminal from the AMF entity.

In a possible design, determining, by a terminal, a session type of a PDU session includes: determining, by the terminal based on a second correspondence, a data network (DN) identifier corresponding to the APP; determining, by the terminal, a DN type corresponding to the DN identifier; and determining, by the terminal based on a third correspondence, the session type corresponding to the DN type, where the second correspondence is a correspondence between an APP and a DN identifier, and the third correspondence is a correspondence between a DN type and a session type of a PDU session.

In a possible design, the terminal sends a request message to the AMF entity, and receives the DN identifier and the DN type that are sent by the AMF entity based on the request message. Alternatively, the terminal receives the DN identifier and the DN type that are broadcast by a radio access network (RAN) device.

In a possible design, the terminal sends first DN information to the AMF entity, where the first DN information includes the DN identifier or includes the DN identifier and the DN type, the first DN information is used by the AMF entity to determine a session management function (SMF) entity based on the DN identifier, and the SMF entity is configured to establish the PDU session of the session type.

According to a second aspect, this application provides a session handling method, including: receiving, by a session management function (SMF) entity, a second message from an access and mobility management function (AMF) entity, where the second message includes a session type, of a packet data unit (PDU) session, requested by a terminal, and the second message is used to request to establish the PDU session; and establishing, by the SMF entity, the PDU session based on the session type of the PDU session.

In a possible design, the SMF entity receives a DN identifier from the AMF entity. Additionally, the SMF entity determines a user plane function (UPF) entity based on the DN identifier and the session type of the PDU session, where the UPF entity is configured to establish the PDU session of the session type.

According to a third aspect, this application provides a session handling method, including: receiving, by a session management function (SMF) entity, a second message from an AMF entity, where the second message includes second DN information, and the second message is used to request to establish a PDU session; and determining, by the SMF entity, a session type of the PDU session based on the second DN information.

In a possible design, when the second DN information includes a DN identifier, determining, by the SMF entity, a session type of the PDU session based on the second DN information includes: determining, by the SMF entity, a DN type based on the DN identifier; and determining the session type of the PDU session based on the DN type. Alternatively, when the second DN information includes a DN type, determining, by the SMF entity, a session type of the PDU session based on the second DN information includes determining, by the SMF entity, the session type of the PDU session based on the DN type.

In a possible design, if the second message carries a session type of a PDU session, requested by the terminal, when the session type of the PDU session that is determined by the SMF entity based on the second DN information is inconsistent with the session type of the PDU session, requested by the terminal, the method further includes sending, by the SMF entity, a session reject message to a terminal, where the session reject message includes the session type of the PDU session that is determined by the SMF entity based on the second DN information.

In a possible design, the SMF entity establishes the PDU session based on the session type of the PDU session.

In a possible design, the SMF entity determines a UPF entity based on the second DN information, and establishes the PDU session of the session type.

According to a fourth aspect, this application provides a session handling method, including: receiving, by an AMF entity, a first message and first DN information from a terminal, where the first message is used to request to establish a PDU session; determining, by the AMF entity, a session management function (SMF) entity based on the first DN information; and sending, by the AMF entity, a second message to the SMF entity based on the first message, where the second message is used to request to establish the PDU session, and a session type of the PDU session corresponds to the first DN information.

In a possible design, the first message and the second message include a session type, of a PDU session, requested by the terminal. Alternatively, the first DN information includes a DN identifier, the second message includes the DN identifier, and the DN identifier is used by the SMF entity to determine the session type of the PDU session based on the DN identifier.

In a possible design, the first DN information includes the DN identifier. Additionally, determining, by the AMF entity, an SMF entity based on the first DN information includes: determining, by the AMF entity, a DN type based on the DN identifier; sending, by the AMF entity, the DN identifier and the DN type to a network repository function (NRF) entity; and receiving, by the AMF entity, the SMF entity from the NRF entity, where the SMF entity is determined by the NRF entity based on the DN identifier and the DN type.

In a possible design, the AMF entity: receives a registration request message from the terminal; obtains, from a database based on the registration request message, DN information to which the terminal subscribes, where the subscribed DN information includes a DN identifier and a DN type; and sends, to the terminal, the DN information to which the terminal subscribes.

In a possible design, the registration request message includes capability indication information of the terminal, where the capability indication information is used to indicate a data network supported by the terminal. Additionally, the DN information to which the terminal subscribes corresponds to the data network supported by the terminal.

According to a fifth aspect, this application provides an apparatus. The apparatus may be a terminal, or may be a chip in a terminal. The apparatus has functions of implementing various designs of the first aspect. The functions may be implemented by hardware, or may be implemented by hardware executing corresponding software. The hardware or the software includes one or more modules corresponding to the foregoing functions.

In a possible design, when the apparatus is a terminal, the terminal includes a processing unit and a communications unit. The processing unit may be, for example, a processor. The communications unit may be, for example, a transceiver, and the transceiver includes a radio frequency circuit. Optionally, the terminal further includes a storage unit, and the storage unit may be, for example, a memory. When the terminal includes the storage unit, the storage unit is configured to store a computer-executable instruction. The processing unit is connected to the storage unit. The processing unit executes the computer-executable instruction stored in the storage unit to enable the terminal to perform the session handling method in any design of the first aspect.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the session handling method in any design of the first aspect to be performed. Optionally, the storage unit is a storage unit in the chip, for example, a register or a buffer, or the storage unit may be a storage unit in the terminal but outside the chip, for example, a read-only memory (ROM), another type of static storage device capable of storing static information and instructions, or a random-access memory (RAM).

The processor mentioned anywhere above may be a general-purpose central processing unit (CPU), a microprocessor, an application-specific integrated circuit (ASIC), or one or more integrated circuits for controlling program execution of the session handling method in the first aspect.

According to a sixth aspect, this application provides an apparatus. The apparatus may be an SMF entity, or may be a chip in an SMF entity. The apparatus has functions of implementing various designs of the second aspect. The functions may be implemented by hardware, or may be implemented by hardware executing corresponding software. The hardware or the software includes one or more modules corresponding to the foregoing functions.

In a possible design, when the apparatus is an SMF entity, the SMF entity includes a processing unit and a communications unit. The processing unit may be, for example, a processor. The communications unit may be, for example, a transceiver, and the transceiver includes a radio frequency circuit. Optionally, the SMF entity further includes a storage unit, and the storage unit may be, for example, a memory. When the SMF entity includes the storage unit, the storage unit is configured to store a computer-executable instruction. The processing unit is connected to the storage unit. The processing unit executes the computer-executable instruction stored in the storage unit, to enable the SMF entity to perform the session handling method in any design of the second aspect.

In another possible design, when the apparatus is a chip in an SMF entity, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the session handling method in any design of the second aspect to be performed. Optionally, the storage unit is a storage unit in the chip, for example, a register or a buffer, or the storage unit may be a storage unit in the SMF entity but outside the chip, for example, a ROM, another type of static storage device capable of storing static information and instructions, or a RAM.

The processor mentioned anywhere above may be a general-purpose central processing unit (CPU), a microprocessor, an ASIC, or one or more integrated circuits for controlling program execution of the session handling method in the first aspect.

According to a seventh aspect, this application provides an apparatus. The apparatus may be an SMF entity, or may be a chip in an SMF entity. The apparatus has functions of implementing various designs of the third aspect. The functions may be implemented by hardware, or may be implemented by hardware executing corresponding software. The hardware or the software includes one or more modules corresponding to the foregoing functions.

In a possible design, when the apparatus is an SMF entity, the SMF entity includes a processing unit and a communications unit. The processing unit may be, for example, a processor. The communications unit may be, for example, a transceiver, and the transceiver includes a radio frequency circuit. Optionally, the SMF entity further includes a storage unit, and the storage unit may be, for example, a memory. When the SMF entity includes the storage unit, the storage unit is configured to store a computer-executable instruction. The processing unit is connected to the storage unit. The processing unit executes the computer-executable instruction stored in the storage unit, to enable the SMF entity to perform the session handling method in any design of the third aspect.

In another possible design, when the apparatus is a chip in an SMF entity, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the session handling method in any design of the third aspect to be performed. Optionally, the storage unit is a storage unit in the chip, for example, a register or a buffer, or the storage unit may be a storage unit in the SMF entity but outside the chip, for example, a ROM, another type of static storage device capable of storing static information and instructions, or a RAM.

The processor mentioned anywhere above may be a general-purpose central processing unit (CPU), a microprocessor, an ASIC, or one or more integrated circuits for controlling program execution of the session handling method in the first aspect.

According to an eighth aspect, this application provides an apparatus. The apparatus may be an AMF entity, or may be a chip in an AMF entity. The apparatus has functions of implementing various designs of the fourth aspect. The functions may be implemented by hardware, or may be implemented by hardware executing corresponding software. The hardware or the software includes one or more modules corresponding to the foregoing functions.

In a possible design, when the apparatus is an AMF entity, the AMF entity includes a processing unit and a communications unit. The processing unit may be, for example, a processor. The communications unit may be, for example, a transceiver, and the transceiver includes a radio frequency circuit. Optionally, the AMF entity further includes a storage unit, and the storage unit may be, for example, a memory. When the AMF entity includes the storage unit, the storage unit is configured to store a computer-executable instruction. The processing unit is connected to the storage unit. The processing unit executes the computer-executable instruction stored in the storage unit, to enable the AMF entity to perform the session handling method in any design of the fourth aspect.

In another possible design, when the apparatus is a chip in an AMF entity, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the session handling method in any design of the fourth aspect to be performed. Optionally, the storage unit is a storage unit in the chip, for example, a register or a buffer, or the storage unit may be a storage unit in the AMF entity but outside the chip, for example, a ROM, another type of static storage device capable of storing static information and instructions, or a RAM.

The processor mentioned anywhere above may be a general-purpose central processing unit (CPU), a microprocessor, an ASIC, or one or more integrated circuits for controlling program execution of the session handling method in the fourth aspect.

According to a ninth aspect, this application further provides a computer-readable storage medium. The computer-readable storage medium stores an instruction, and when the instruction is run on a computer, the computer is enabled to perform the method in the first aspect. The computer may be, for example, a terminal.

According to a tenth aspect, this application further provides a computer-readable storage medium. The computer-readable storage medium stores an instruction, and when the instruction is run on a computer, the computer is enabled to perform the method in the second aspect. The computer may be, for example, an SMF entity.

According to an eleventh aspect, this application further provides a computer-readable storage medium. The computer-readable storage medium stores an instruction, and when the instruction is run on a computer, the computer is enabled to perform the method in the third aspect. The computer may be, for example, an SMF entity.

According to a twelfth aspect, this application further provides a computer-readable storage medium. The computer-readable storage medium stores an instruction, and when the instruction is run on a computer, the computer is enabled to perform the method in the fourth aspect. The computer may be, for example, an AMF entity.

According to a thirteenth aspect, this application provides a computer program product. The computer program product includes a computer software instruction, and the computer software instruction may be loaded by a processor to implement a procedure of the session handling method in any design of the first aspect.

According to a fourteenth aspect, this application provides a computer program product. The computer program product includes a computer software instruction, and the computer software instruction may be loaded by a processor to implement a procedure of the session handling method in any design of the second aspect.

According to a fifteenth aspect, this application provides a computer program product. The computer program product includes a computer software instruction, and the computer software instruction may be loaded by a processor to implement a procedure of the session handling method in any design of the third aspect.

According to a sixteenth aspect, this application provides a computer program product. The computer program product includes a computer software instruction, and the computer software instruction may be loaded by a processor to implement a procedure of the session handling method in any design of the fourth aspect.

In addition, for technical effects brought by any design manner of the second aspect to the sixteenth aspect, refer to technical effects brought by different design manners of the first aspect. Details are not described herein again.

These aspects or other aspects of the present disclosure are clearer and more comprehensible in descriptions of the following embodiments.

DESCRIPTION OF EMBODIMENTS

To make the objectives, technical solutions, and advantages of this application clearer, the following further describes this application in detail with reference to the accompanying drawings.

It should be noted that, a session handling method in this application may be performed by an apparatus. On a network side, the apparatus may be a session management function (SMF) entity or a chip in an SMF entity, or the apparatus may be an access and mobility management function (AMF) entity or a chip in an AMF entity. On a terminal side, the apparatus may be a terminal or a chip in a terminal.

For ease of description, in this application, the session handling method is described using an example in which the apparatus is an AMF entity, an SMF entity, or a terminal. For an implementation method in which the apparatus is a chip in an AMF entity, a chip in an SMF entity, or a chip in a terminal, refer to descriptions about the session handling method in which the apparatus is an AMF entity, an SMF entity, or a terminal. Details are not described again.

Figure 1:
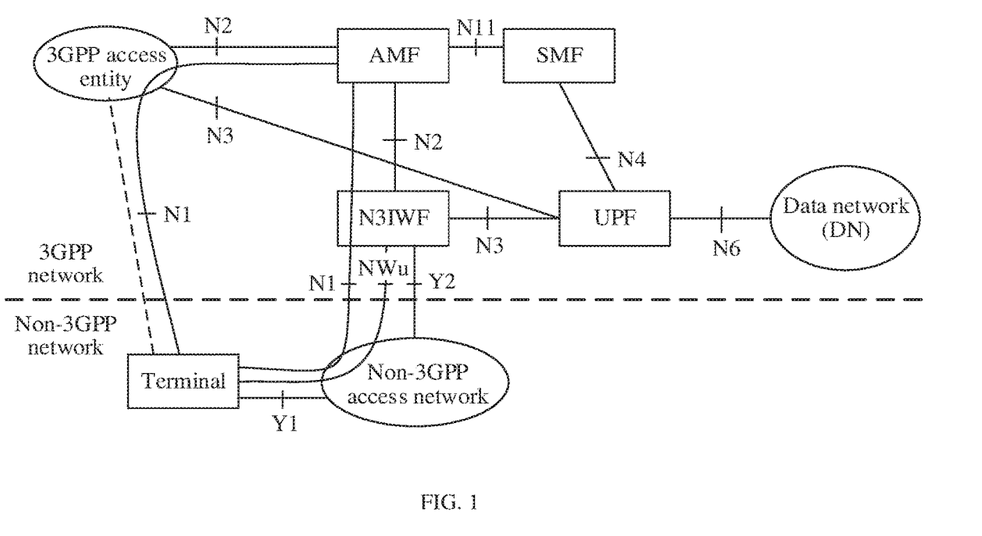
FIG. 1 is a schematic diagram of a possible network architecture to which this application is applicable.

FIG. 1 is a schematic diagram of a possible network architecture to which this application is applicable. The schematic diagram of the network architecture includes a terminal, a 3rd Generation Partnership Project (3GPP) access network entity, a non-3GPP access network, a non-3GPP interworking function (N3IWF), an AMF entity, a session management function (SMF) entity, a user plane function (UPF) entity, a data network (DN), and the like.

The terminal is a device having wireless receiving and sending functions. The terminal may be deployed on land, for example, an indoor or outdoor device, a handheld device, or a vehicle-mounted device, or may be deployed on a water surface (for example, on a ship), or may be deployed in the air (for example, on an airplane, a balloon, or a satellite). The terminal may be a mobile phone, a tablet computer (e.g., pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like.

The 3GPP access network entity is also referred to as a radio access network (RAN) entity, and may be, for example, a base station in 5G. The non-3GPP access network is an access network other than the 3GPP access network, for example, a wireless local area network (WLAN) access network. The N3IWF is similar to an evolved packet data gateway (ePDG) in long term evolution (LTE), and is configured such that when a user equipment (UE) accesses a 5G network using a non-3GPP technology, the N3IWF establishes an Internet Protocol (IP) security (IPsec) tunnel with the UE. In a future 5G definition, the name N3IWF may be changed.

The AMF entity is responsible for access management and mobility management of the terminal. In actual application, the AMF entity includes a mobility management function in a mobility management entity (MME) in a network framework in LTE, and an access management function is added to the AMF entity.

The SMF entity is responsible for session management, that is, a session management function in the MME entity, for example, establishment of a session for a user. The UPF entity is a user plane function entity of the terminal, and is mainly responsible for connecting to an external network. The UPF entity provides related functions of a serving gateway (SGW) and a public data network (PDN) gateway of LTE. The DN is responsible for providing a data service for the terminal, for example, providing a network access function and a text messaging function for the terminal.

In this application, a DN identifier is used to identify a data network. A new attribute DN type is added. The DN type is used to indicate a type of a data network. For example, the DN type includes Internet, Ethernet, and an unstructured network.

In this application, the DN identifier and/or the DN type may be collectively referred to as DN information. To be more specific, the DN information includes the DN identifier, or the DN information includes the DN type, or the DN information includes the DN identifier and the DN type.

In an implementation, in a 3GPP standard, a currently defined data network name (DNN) is used to identify a data network, and according to the currently defined DNN, the DNN is used only as an identifier of the data network, that is, the DN identifier. In this application, after the DN type is newly added, there are the following two implementations of indicating the DN type.

In a first implementation, the DN identifier and the DN type may be separately indicated using independent information elements. To be more specific, the DN identifier is still identified using the DNN defined in the current 3GPP standard, but a new information element DN Type is independently defined to identify the DN type.

In a second implementation, the DN identifier and the DN type may be indicated by a same information element. For example, the definition of the current DNN is extended such that the DNN can indicate both the DN identifier and the DN type. To be more specific, a field, that is, the DN type, is added to the current DNN. In other words, the extended DNN includes the DN identifier and the DN type. In an example, a field of the DNN may be defined as two parts. A value of a former part of the field is used to identify the DN identifier. For example, 0001 identifies an intra-enterprise network. A value of a latter part of the field is used to identify the DN type. For example, 0002 identifies that the intra-enterprise network is of an Ethernet type. In this case, a whole field 00010002 is a specific value of the DNN. In the implementation, this information element of DNN includes two pieces of information: the DN identifier and the DN type.

According to the foregoing two implementations, it may be understood that the DN identifier mentioned in subsequent embodiments refers to the DNN (the first implementation), or the field that is in the DNN and that is used to identify the data network (the second implementation).

Based on the system architecture shown in FIG. 1, this application provides a session handling method, including: initiating, by a terminal, an application (APP); determining a session type of a packet data unit (PDU) session based on the APP; and sending, by the terminal, a first message to an access and mobility management function (AMF) entity, where the first message includes the session type, and the first message is used to request to establish the PDU session of the session type. In the method, when initiating, to the AMF entity, the first message used to request to establish the PDU session, the terminal adds the session type of the PDU session to the first message, such that a network side can establish the PDU session of the corresponding type based on the session type of the PDU session that is sent by the terminal, in order to establish the PDU session of the correct type for the terminal, thereby improving correctness of communication between the terminal and the network side.

The following describes the session handling method provided in this application with reference to the accompanying drawings.

Embodiment 1

In Embodiment 1, a terminal may determine a session type of a PDU session, and send the session type to a network side to establish the PDU session.

Figure 2:
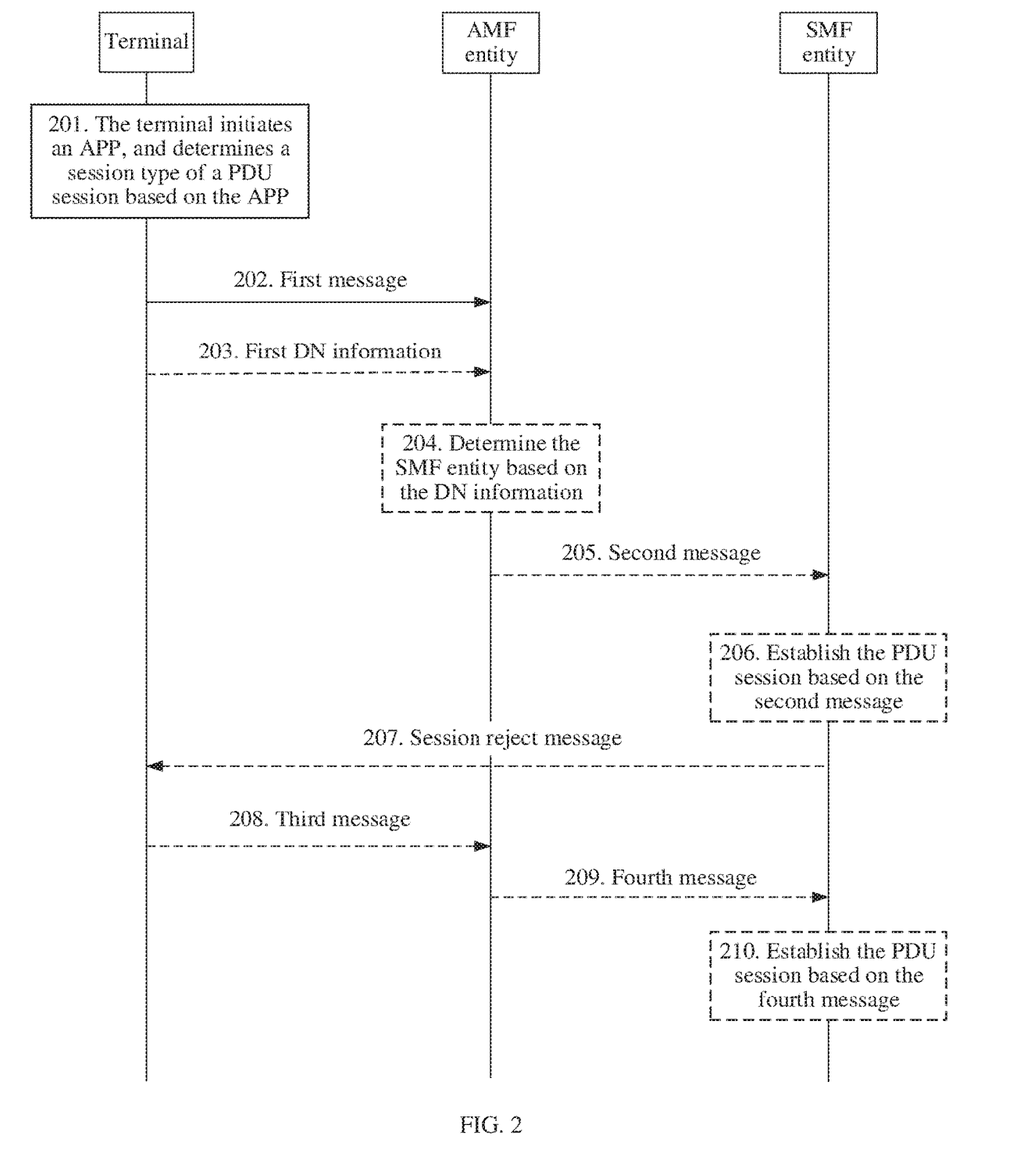
FIG. 2 is a flowchart of a session handling method according to this application.

FIG. 2 is a flowchart of a session handling method according to this application. The method includes the following steps.

Step 201. The terminal initiates an APP, and determines a session type of a PDU session based on the application (APP).

The APP may be a specific application such as "Youku" or "Baidu", or may be a type of application such as a video application, a text application, or a picture application.

When determining to initiate an application (APP), the terminal may determine a session type of a PDU session based on the APP. The following provides two implementations as examples for description.

Implementation 1: The terminal determines, based on a first correspondence, the session type of the PDU session that corresponds to the APP.

The first correspondence records a correspondence between the APP and the session type of the PDU session that corresponds to the APP.

The first correspondence may be recorded in a form of a table, or may be recorded in a form of an array, or may be recorded in a form of a function. This is not limited in this application.

For example, in an implementation, the first correspondence may be implemented in combination with a UE route selection policy (URSP) table in other approaches. Table 1 is a URSP table in other approaches.

TABLE 1

| | |
|---|---|
| Data matching rule (Traffic filter) | App = DummyApp (a video application) |
| Data offload policy (Direct offload) | Prohibited |
| Slice information (Slice Info) | S-NSSAI-a |
| Session and service continuity (SSC) type (Continuity Types) | SSC Mode 3 |
| DN identifier | internet |
| Access type | 3GPP access |

Traffic filter refers to a data matching rule, and the parameter is used to determine, based on an APP initiated by the terminal, whether the following other policies defined in Table 1 are applicable. For example, in Table 1, when the terminal initiates a Youku APP, because Youku is a video APP, this policy determines that the other policies in the table are applicable to the Youku APP. When the terminal initiates a WeChat APP, the other policies in the table are not applicable.

Direct offload refers to a data offload policy, and the parameter is used to determine that the APP or a type of APPs can use data offloading. For example, in the foregoing Table 1, Prohibited means that a video application cannot use data offloading.

Slice Info is slice information, and the parameter is used to determine slice information that needs to be used to initiate the APP, such that the UE adds the slice information when initiating a PDU session. For example, in the foregoing Table 1, when initiating the APP, the UE determines that the slice information (e.g., single network slice assistance information (S-NSSAI-a)) needs to be used.

Continuity Types is a session continuity type, and the parameter is used to determine a session continuity type required by the APP. For example, in the foregoing Table 1, when initiating the APP, the UE determines that the required session continuity type is SSC mode 3.

The DN identifier is an identifier of a data network, and the parameter is used to indicate a name of the data network. For example, in the foregoing Table 1, a data network indicated by the DN identifier is the interne.

Access Type is a parameter used to determine an access type required by the APP. For example, in the foregoing Table 1, when initiating the APP, the UE determines that the required access type is a 3 GPP access type.

Based on Table 1, if a correspondence between the DummyApp and the session type of the PDU session that corresponds to the APP needs to be recorded, a "PDU Type" attribute may be added to the foregoing Table 1. "PDU Type" is a session type of a PDU session, such that the first correspondence is established. Table 2 is a URSP table to which the attribute "PDU Type" is added.

TABLE 2

| | |
|---|---|
| Data matching rule (Traffic filter) | App = DummyApp (a video application) |
| Data offload policy (Direct offload) | Prohibited |
| Slice information (Slice Info) | S-NSSAI-a |
| Session continuity type (Continuity Types) | SSC Mode 3 |
| DN identifier | internet |
| Access type (Access Type) | 3GPP access |
| Packet data unit session type (PDU Type) | Ethernet |

Therefore, when initiating an application such as DummyApp, the terminal may determine, according to the first correspondence in the foregoing Table 2, to be more specific, the correspondence between DummyApp and PDU Type, that the PDU Type corresponding to the DummyApp is Ethernet.

The first correspondence may be preconfigured on the terminal, or may be obtained by the terminal from a network side, for example, an AMF entity.

The implementation of the foregoing Table 2 is used as an example. The foregoing URSP table may be preconfigured on the terminal. Alternatively, when moving to coverage of a data network, the terminal may receive a URSP table broadcast by the data network, and the terminal may locally store the received URSP table, or update a locally stored URSP table based on the received URSP table.

Implementation 2: The terminal determines the session type of the PDU session based on the APP, a DN identifier, and a DN type.

In this manner, the terminal may first obtain DN information from a network side such as an AMF entity, where the DN information includes the DN identifier and the DN type. An obtaining method includes but is not limited to the following.

Obtaining method 1: The terminal sends a request message to the AMF entity, to request to obtain the DN identifier and the DN type.

For example, when moving to a data network, the terminal may send a registration request message to an AMF entity. After receiving the registration request message, the AMF entity obtains, from a database, DN information to which the terminal subscribes, where the DN information includes a DN identifier and a DN type. Then, the AMF entity sends the DN identifier and the DN type to the terminal, such that the terminal obtains the DN identifier and the DN type.

Optionally, the registration request message includes capability indication information of the terminal, where the capability indication information is used to indicate a data network supported by the terminal. In this case, the subscribed DN information sent by the AMF entity to the terminal is DN information corresponding to the data network supported by the terminal. For example, if the capability indication information indicates that the data network supported by the terminal is the internet, the subscribed DN information sent by the AMF entity to the terminal includes a DN identifier and a DN type that are related to the internet, rather than a DN identifier and a DN type that are of another data network.

Optionally, the AMF entity sends the DN information or the DN identifier to a policy charging function (PCF) entity. Optionally, the PCF entity determines a service range of the DN based on the DN information or the DN identifier, and sends the service range to the AMF entity.

Optionally, the AMF entity determines, based on current location information of the terminal, whether the terminal is currently in the service range of the DN. If the terminal is currently in the service range of the DN, the AMF entity determines to send the DN information to the terminal. For example, the AMF sends a response message to the terminal, where the response message includes the DN information, and the DN information includes the DN identifier and the DN type.

Optionally, the AMF entity notifies the terminal of the service range of the DN, and the terminal determines whether the terminal is currently in the service range of the DN.

Obtaining method 2: The terminal receives the DN identifier and the DN type that are broadcast by a RAN device such as a base station.

Based on a premise that the terminal can obtain the DN identifier and the DN type from the network side, when initiating an application (APP), the terminal first determines, based on a second correspondence, a DN identifier corresponding to the APP. The second correspondence is a correspondence between an APP and a DN identifier. For example, the second correspondence may be recorded in the foregoing Table 1. The DN identifier corresponding to the APP may be obtained based on the APP. In addition, the DN identifier is the DN identifier obtained by the terminal from the network side.

Then, the terminal determines a DN type corresponding to the DN identifier. The DN type is the DN type obtained by the terminal from the network side.

Then, the terminal determines, based on a third correspondence, a session type of a PDU session that corresponds to the DN type. The third correspondence is a correspondence between a DN type and a session type of a PDU session. The third correspondence may be preconfigured on the terminal.

In Implementation 2, the correspondence between an APP and a DN identifier and the correspondence between a DN type and a session type of a PDU session are preconfigured on the terminal. Therefore, after obtaining the DN identifier and the DN type from the network side, the terminal may determine a DN identifier based on a to-be-initiated APP, determine a DN type based on the DN identifier, and determine a session type of a PDU session based on the DN type.

Step 202. The terminal sends a first message to the AMF entity, and the AMF entity receives the first message from the terminal.

The first message includes the session type of the PDU session, and the first message is used to request to establish the PDU session of the session type.

In this embodiment, when sending, to the AMF entity, the first message used to request to establish the PDU session, the terminal adds the session type of the PDU session to the first message, such that the network side can establish the PDU session of the corresponding type based on the session type of the PDU session that is sent by the terminal, in order to establish the PDU session of the correct type for the terminal, thereby ensuring correct communication between the terminal and the network side.

Optionally, after the foregoing step 202, the method further includes the following steps.

Step 203. The terminal sends first DN information to the AMF entity, and the AMF entity receives the first DN information from the terminal. The first DN information includes the DN identifier, or the first DN information includes the DN identifier and the DN type (a form of the first DN information may be any one of the foregoing two implementations).

It should be noted that step 203 may alternatively be performed before step 202. Alternatively, step 202 and step 203 are combined into one step. In other words, the terminal simultaneously sends the first message and the first DN information to the AMF entity, for example, sends the first message and the first DN information using a non-access stratum (NAS) message.

Step 204. The AMF entity determines an SMF entity based on the first DN information.

When the first DN information includes the DN identifier, the AMF entity further needs to determine the DN type based on the DN identifier. Further, the AMF entity selects an SMF entity based on the DN identifier and the DN type.

When the first DN information includes the DN identifier and the DN type, the AMF entity selects an SMF entity based on the DN identifier and the DN type.

For example, the AMF entity sends the DN identifier and the DN type to a network repository function (NRF) entity, and the NRF entity selects an SMF entity based on the received DN identifier and DN type, and sends the SMF entity to the AMF entity, such that the AMF entity can determine a to-be-used SMF entity.

Step 205. The AMF entity sends a second message to the SMF entity.

The second message is obtained based on the first message. To be more specific, after receiving the first message, the AMF entity does not obtain content of the first message, but generates the second message based on the first message, and sends the second message to the SMF entity. That is, the second message includes the first message.

Optionally, in step 205, the second message further includes second DN information. The second DN informa tion includes the DN identifier, or the second DN informa tion includes the DN identifier and the DN type (a form of the second DN information may be any one of the foregoing two implementations).

If the second DN information sent by the AMF entity to the SMF entity includes the DN identifier, the SMF entity further determines the DN type based on the DN identifier. Further, the SMF entity may determine a type of a PDU session based on the DN type.

If the second DN information sent by the AMF entity to the SMF entity includes the DN identifier and the DN type, the SMF entity may determine a type of a PDU session based on the DN type.

Optionally, the SMF entity compares the session type of the PDU session that is obtained from the second message with the session type of the PDU session that is determined by the SMF entity. If the two session types are the same, the SMF entity performs step 206. If the two session types are different, the SMF entity performs step 207.

Step 206. The SMF entity establishes the PDU session based on the second message.

The SMF entity establishes the PDU session based on the session type of the PDU session that is obtained from the second message. For example, the SMF entity obtains the session type of the PDU session that is carried in the first message in the second message.

Because the session type of the PDU session that is obtained by the SMF entity from the second message is the same as the session type of the PDU session that is determined by the SMF entity, the SMF entity may directly establish the PDU session based on the session type of the PDU session that is in the second message.

The procedure ends.

Through step 201 to step 206, the terminal adds the session type of the PDU session to the first message when sending the first message to the AMF entity. Then the AMF entity sends the session type of the PDU session to the SMF entity using the second message, such that the SMF entity establishes the PDU session based on the session type. In this way, the PDU session of the correct type is established.

Step 207. The SMF entity sends a session reject message to the terminal using the AMF entity.

If the session type of the PDU session that is obtained by the SMF entity from the second message is different from the session type of the PDU session that is determined by the SMF entity, the SMF entity sends the session reject message to the terminal. Optionally, the session reject message includes the session type of the PDU session that is determined by the SMF entity based on the DN information.

To be more specific, the SMF entity considers that the session type of the PDU session that is carried in the first message sent by the terminal in the foregoing step 202 is incorrect, and further, considers that another parameter related to the first message is also incorrect. Therefore, the SMF entity sends the session reject message to the terminal, where the session reject message carries the session type of the PDU session that is determined by the SMF entity, such that the terminal: re-initiates a process of requesting to establish a PDU session; adds the correct session type of a PDU session to a new request; and adds another correct parameter to the new request, where the correct session type of a PDU session is the session type that is sent by the SMF entity to the terminal using the session reject message.

Step 208. The terminal sends a third message to the AMF entity, and the AMF entity receives the third message from the terminal.

This step is similar to step 202. However, the third message in step 208 carries the session type of the PDU session that is added by the SMF entity to the session reject message, that is, the correct session type of a PDU session. The third message is used to request to establish the PDU session.

Step 209. The AMF entity sends a fourth message to the SMF entity, and the SMF entity receives the fourth message from the AMF entity.

This step is similar to step 205. However, the fourth message in step 209 is generated based on the third message, and the AMF entity does not learn of content of the third message and content of the fourth message. The fourth message carries the correct session type of a PDU session. The fourth message is used to request to establish the PDU session.

Step 210. The SMF entity establishes the PDU session based on the fourth message.

The procedure ends.

Through step 201 to step 205 and step 207 to step 210, the terminal adds the session type of the PDU session to the first message when sending the first message to the AMF entity. Then the AMF entity sends the session type of the PDU session to the SMF entity using the second message. When determining that the received session type of a PDU session is incorrect, the SMF entity instructs the terminal to re-initiate the third message, and the SMF entity receives the fourth message from the AMF entity, to receive the correct session type using the fourth message, and establish the PDU session. In this way, a correct type of PDU session is established.

Optionally, after step 205, alternatively, the SMF entity may directly establish the PDU session. In other words, the SMF entity directly establishes, based on the session type of the PDU session that is in the second message, the PDU session corresponding to the session type. To be more specific, the SMF entity does not determine whether the session type of the PDU session that is determined by the SMF entity is the same as the session type of the PDU session that is carried in the second message.

Optionally, in step 206 or step 210, when establishing the PDU session, the SMF entity establishes the PDU session together with a UPF entity. Therefore, the SMF entity further needs to select a UPF entity. Optionally, the SMF entity determines the UPF entity based on the DN identifier and the session type of the PDU session, where the DN identifier may be sent by the AMF entity to the SMF entity.

Embodiment 2

A main difference between this embodiment and Embodiment 1 is that the terminal does not send a session type of a PDU session to a network side, but an SMF entity on the network side determines a session type of a PDU session, and establishes the PDU session.

Figure 3:
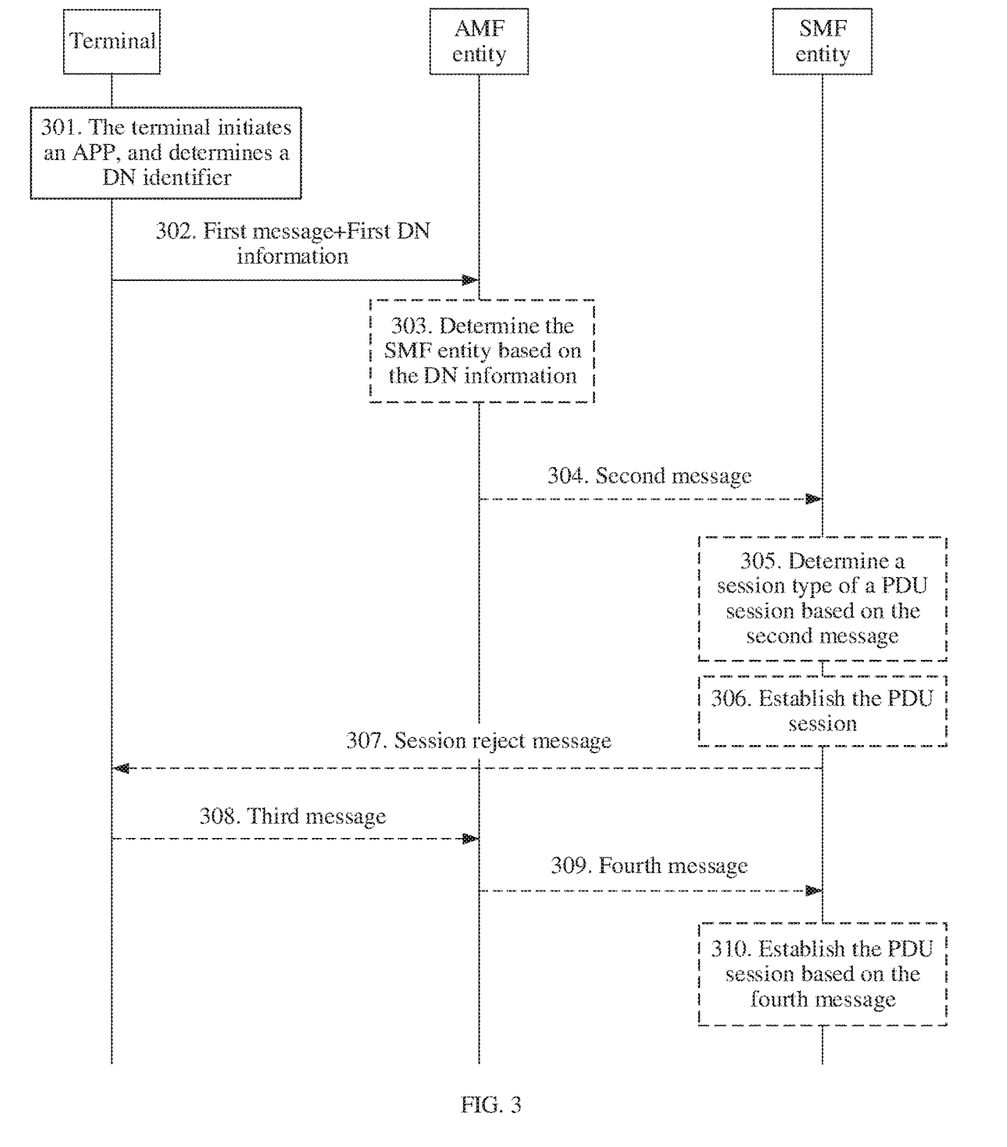
FIG. 3 is a flowchart of another session handling method according to this application.

FIG. 3 is a flowchart of another session handling method according to this application. The method includes the following steps.

Step 301. A terminal initiates an APP, and determines a DN identifier.

In the step, when initiating the APP, the terminal cannot obtain a session type of a PDU session, but may determine the DN identifier corresponding to the APP. In other words, the terminal may determine an identifier of a data network that the terminal needs to access.

For example, in an implementation, the terminal may obtain, according to Table 1 in the foregoing Embodiment 1, the DN identifier corresponding to the APP.

Step 301 may be implemented according to other approaches, and details are not described again.

Step 302. The terminal sends a first message and first DN information to an AMF entity.

The first DN information includes the DN identifier. The first message is used to request to establish a PDU session, and the first DN information may be used by the AMF entity to determine an SMF entity.

Optionally, the method further includes the following steps.

Step 303. The AMF entity determines the SMF entity based on the first DN information.

Step 303 is similar to step 204 in Embodiment 1. To be more specific, the AMF entity first determines a DN type based on the DN identifier in the DN information, and then the AMF entity determines the SMF entity based on the DN type and the DN identifier. For details, refer to descriptions of step 204. Details are not described again.

Step 304. The AMF entity sends a second message to the SMF entity.

The second message is generated based on the first message, and the second message is used to request to establish the PDU session. The second message further includes second DN information. In other words, the second message includes the first message and the second DN information. In addition, the AMF entity does not learn of specific content of the first message.

The second DN information includes the DN identifier, or the second DN information includes the DN identifier and the DN type.

Step 305. The SMF entity determines a session type of a PDU session based on the second message.

After the SMF entity receives the second DN information, if the second DN information includes the DN identifier, the SMF entity determines the DN type based on the DN identifier, and then determines the session type of the PDU session based on the DN type.

If the second DN information includes the DN identifier and the DN type, the SMF entity obtains the DN type from the second DN information, and then determines the session type of the PDU session based on the DN type.

After step 305, there are two implementations. One is directly establishing the PDU session, in other words, performing step 306. The other is instructing the terminal to re-initiate a process of requesting to establish a PDU session, in other words, performing step 307. The two implementations are described below.

Step 306. The SMF entity establishes the PDU session.

In the foregoing step 305, the SMF entity has determined the session type of the PDU session. Therefore, the SMF entity may directly establish the PDU session of the session type.

The procedure ends.

Step 307. The SMF entity sends a session reject message to the terminal using the AMF entity.

To improve accuracy of establishing the PDU session, the SMF entity may further send the session reject message to the terminal using the AMF entity, where the session reject message carries the session type of the PDU session that is determined by the SMF entity, such that the terminal re-initiates a session establishment procedure.

Step 308. The terminal sends a third message to the AMF entity, and the AMF entity receives the third message from the terminal.

Step 309. The AMF entity sends a fourth message to the SMF entity, and the SMF entity receives the fourth message from the AMF entity.

Step 310. The SMF entity establishes the PDU session based on the fourth message.

The foregoing Step 308 to step 310 are similar to step 208 to step 210 in Embodiment 1. For details, refer to the foregoing descriptions. Details are not described again.

The procedure ends.

Through step 301 to step 305 and step 307 to step 310, the terminal adds the DN identifier to the first message when sending the first message to the AMF entity. Then the AMF entity sends the DN identifier to the SMF entity using the second message. After determining the session type of the PDU session, the SMF entity instructs the terminal to re-initiate the third message, and the SMF entity receives the fourth message from the AMF entity, to receive the correct session type using the fourth message, and establish the PDU session. In this way, a correct type of PDU session is established.

Optionally, in step 306 or step 310, when establishing the PDU session, the SMF entity establishes the PDU session together with a UPF entity. Therefore, the SMF entity further needs to select a UPF entity. Optionally, the SMF entity determines the UPF entity based on the DN identifier and the session type of the PDU session, where the DN identifier may be sent by the AMF entity to the SMF entity.

Figure 4:
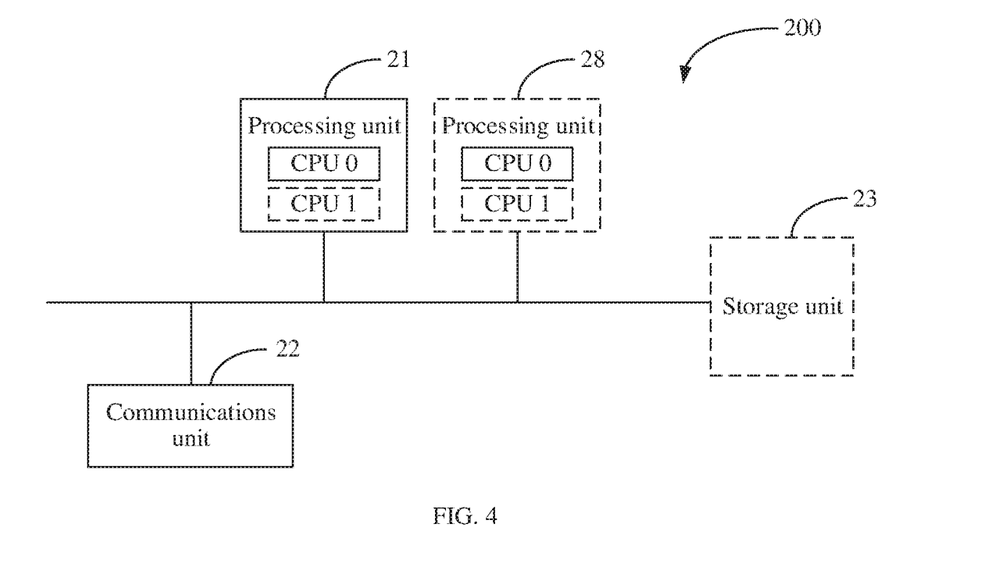
FIG. 4 is a schematic structural diagram of an apparatus according to this application.

FIG. 4 is a schematic diagram of an apparatus according to this application. The apparatus may be the terminal, the AMF entity, or the SMF entity in any one of the foregoing embodiments. The apparatus may be the terminal in the system architecture shown in FIG. 1 or a chip in the terminal, may be the AMF entity in the system architecture shown in FIG. 1 or a chip in the AMF entity, or may be the SMF entity in the system architecture shown in FIG. 1 or a chip in the SMF entity.

The apparatus 200 may be configured to perform a method performed by the terminal, the AMF entity, or the SMF entity in any foregoing session handling method.

The apparatus 200 includes at least one processing unit 21 and a communications unit 22, and optionally, further includes a storage unit 23. The processing unit 21, the communications unit 22, and the storage unit 23 are connected using a communications bus.

The processing unit 21 may be a general-purpose central processing unit (CPU), a microprocessor, an application-specific integrated circuit (ASIC), or one or more integrated circuits configured to control program execution in the solutions of the present disclosure.

The communications bus may include a path for transmitting information between the foregoing units.

The communications unit 22 may be an apparatus with a transceiver function, and is configured to communicate with another device or a communications network, for example, Ethernet, a radio access network (RAN), or a wireless local area network (WLAN).

The storage unit 23 may be a read-only memory (ROM), another type of static storage device capable of storing static information and instructions, a random access memory (RAM), or another type of dynamic storage device that capable of storing information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer.

However, this is not limited herein. The storage unit 23 may exist independently, and is connected to the processing unit 21 using the communications bus. The storage unit 23 may alternatively be integrated with the processing unit. The storage unit 23 is configured to store application program code used to execute the solutions of the present disclosure, and the application program code is executed under control of the processing unit 21. The processing unit 21 is configured to execute the application program code stored in the storage unit 23.

In an implementation, in an embodiment, the processing unit 21 may include one or more CPUs, for example, a CPU 0 and a CPU 1 in FIG. 4.

In an implementation, in an embodiment, the apparatus 200 may include a plurality of processing units, for example, the processing unit 21 and a processing unit 28 in FIG. 4. Each of the processing units may be a single-core (single-CPU) processor, or may be a multi-core (multi-CPU) processor. Herein, the processor may refer to one or more devices, a circuit, and/or a processing core for processing data (for example, a computer program instruction).

In a possible design, when the apparatus is a terminal, an AMF entity, or an SMF entity, the processing unit 21 may be, for example, a processor, the communications unit 22 may be, for example, a transceiver, and the transceiver includes a radio frequency circuit. When the apparatus further includes the storage unit 23, the storage unit 23 is configured to store a computer-executable instruction, the processing unit 21 is connected to the storage unit 23, and the processing unit 21 executes the computer-executable instruction stored in the storage unit 23, such that the terminal, the AMF entity, or the SMF entity performs the session handling method in any one of the foregoing embodiments.

In another possible design, when the apparatus is a chip in a terminal, a chip in an AMF entity, or a chip in an SMF entity, the processing unit 21 may be, for example, a processor, and the communications unit 22 may be, for example, an input/output interface, a pin, or a circuit. The processing unit 21 may execute a computer-executable instruction stored in the storage unit, to enable the chip to perform the session handling method in the foregoing embodiment. Optionally, the storage unit is a storage unit in the chip, for example, a register or a buffer, or the storage unit may be a storage unit in the terminal, the AMF entity, or the SMF entity but outside the chip, for example, a ROM, another type of static storage device capable of storing static information and instructions, or a RAM.

That the chip performs the session handling method may be understood as follows: The chip completes the session handling method with other components in the apparatus.

For example, when the chip is the chip in the terminal, the communications unit of the chip is connected to a transceiver of the terminal. The processing unit of the chip initiates an application (APP), determines a session type of a PDU session, generates a first message, and then sends the first message to the transceiver of the terminal using the communications unit of the chip. The transceiver of the terminal sends the first message to an AMF entity. Therefore, the chip in the terminal implements the session handling method in the embodiments of the present disclosure.

For another example, when the chip is the chip in the SMF entity, the communications unit of the chip is connected to a transceiver of the SMF entity. The transceiver of the SMF entity receives a second message from an AMF entity, and then sends the second message to the communications unit of the chip. Then, the processing unit of the chip establishes a PDU session based on a session type, of a PDU session, in the second message. Therefore, the chip in the SMF entity implements the session handling method in the embodiments of the present disclosure.

For another example, when the chip is the chip in the SMF entity, the communications unit of the chip is connected to a transceiver of the SMF entity. The transceiver of the SMF entity receives a second message from an AMF entity, and then sends the second message to the communications unit of the chip. Then, the processing unit of the chip determines a session type of a PDU session based on DN information in the second message. Therefore, the chip in the SMF entity implements the session handling method in the embodiments of the present disclosure.

For another example, when the chip is the chip in the AMF entity, the communications unit of the chip is connected to a transceiver of the AMF entity. The transceiver of the AMF entity receives a first message and DN information from a terminal, and then sends the first message and the DN information to the communications unit of the chip. Then, the processing unit of the chip generates a second message based on the first message, and controls the communications unit of the chip to send the second message and the DN information to the transceiver of the AMF entity. The transceiver of the AMF entity sends the second message and the DN information to an SMF entity. Therefore, the chip in the AMF entity implements the session handling method in the embodiments of the present disclosure.

For example, when the apparatus is divided in the method shown in FIG. 4, the processing unit 21 cooperates with the communications unit 22, such that the apparatus can implement the session handling method in any one of the foregoing embodiments of this application.

For example, when the apparatus shown in FIG. 4 is the terminal or the chip in the terminal, the processing unit 21 is configured to initiate an application (APP), and determine a session type of a PDU session based on the APP. The communications unit 22 is configured to send a first message to an AMF entity, where the first message includes the session type, and the first message is used to request to establish the PDU session of the session type.

In a possible design, the processing unit 21 is configured to determine, based on a first correspondence, the session type corresponding to the APP, where the first correspondence is a correspondence between an APP and a session type of a PDU session.

In a possible design, the first correspondence is preconfigured on the terminal. Alternatively, the first correspondence is obtained by the terminal from the AMF entity.

In a possible design, the processing unit 21 is configured to: determine, based on a second correspondence, a DN identifier corresponding to the APP; determine a DN type corresponding to the DN identifier; and determine, based on a third correspondence, the session type corresponding to the DN type, where the second correspondence is a correspondence between an APP and a DN identifier, and the third correspondence is a correspondence between a DN type and a session type of a PDU session.

In a possible design, the communications unit 22 is further configured to: send a request message to the AMF entity; and receive the DN identifier and the DN type that are sent by the AMF entity based on the request message; or receive the DN identifier and the DN type that are broadcast by a radio access network (RAN) device.

In a possible design, the communications unit 22 is further configured to send first DN information to the AMF entity, where the first DN information includes the DN identifier or includes the DN identifier and the DN type, the first DN information is used by the AMF entity to determine an SMF entity based on the DN identifier, and the SMF entity is configured to establish the PDU session of the session type.

It should be understood that, the terminal or the chip in the terminal may be configured to implement steps performed by the terminal in the session handling method in the embodiments of the present disclosure. For related features, refer to the foregoing descriptions. Details are not described herein again.

For example, when the apparatus shown in FIG. 4 is the SMF entity or the chip in the SMF entity, the communications unit 22 is configured to receive a second message from an AMF entity, where the second message includes a session type, of a PDU session, requested by a terminal, and the second message is used to request to establish the PDU session. The processing unit 21 is configured to establish the PDU session based on the session type of the PDU session.

In a possible design, the communications unit 22 is further configured to receive a DN identifier from the AMF entity. The processing unit 21 is further configured to determine a user plane function (UPF) entity based on the DN identifier and the session type of the PDU session, where the UPF entity is configured to establish the PDU session of the session type.

It should be understood that, the SMF entity or the chip in the SMF entity may be configured to implement steps performed by the SMF entity in the session handling method in the embodiments of the present disclosure. For related features, refer to the foregoing descriptions. Details are not described herein again.

For example, when the apparatus shown in FIG. 4 is the SMF entity or the chip in the SMF entity, the communications unit 22 is configured to receive a second message from an AMF entity, where the second message includes second data network (DN) information, and the second message is used to request to establish a PDU session. The processing unit 21 is configured to determine a session type of a PDU session based on the second DN information.

In a possible design, the second DN information includes a DN identifier, and the processing unit 21 is configured to: determine a DN type based on the DN identifier; and determine the session type of the PDU session based on the DN type. Alternatively, the second DN information includes a DN type, and the processing unit 21 is configured to determine the session type of the PDU session based on the DN type.

In a possible design, if the second message carries a session type of a PDU session requested by a terminal, when the session type of the PDU session that is determined by the processing unit 21 based on the second DN information is inconsistent with the session type of a PDU session requested by the terminal, the communications unit 22 is configured to send a session reject message to the terminal. The session reject message includes the session type of the PDU session that is determined by the processing unit 21 based on the second DN information.

In a possible design, the processing unit 21 is further configured to establish the PDU session based on the session type of the PDU session.

In a possible design, the processing unit 21 is further configured to: determine a UPF entity based on the second DN information; and establish the PDU session of the session type with the UPF entity.

It should be understood that, the SMF entity or the chip in the SMF entity may be configured to implement steps performed by the SMF entity in the session handling method in the embodiments of the present disclosure. For related features, refer to the foregoing descriptions. Details are not described herein again.

For example, when the apparatus shown in FIG. 4 is the AMF entity or the chip in the AMF entity, the communications unit 22 is configured to receive a first message and first DN information from a terminal, where the first message is used to request to establish a PDU session. The processing unit 21 is configured to: determine a session management function (SMF) entity based on the first DN information; and send a second message to the SMF entity based on the first message, where the second message is used to request to establish the PDU session, and a session type of the PDU session corresponds to the first DN information.

In a possible design, the first message and the second message include a session type of a PDU session requested by the terminal. Alternatively, the first DN information includes a DN identifier, the second message includes the DN identifier, and the DN identifier is used by the SMF entity to determine the session type of the PDU session based on the DN identifier.

In a possible design, the first DN information includes the DN identifier, and the communications unit 22 is further configured to receive the DN identifier from the terminal. The processing unit 21 is configured to determine a DN type based on the DN identifier. The communications unit 22 is further configured to: send the DN identifier and the DN type to an NRF entity; and receive the SMF entity from the NRF entity, where the SMF entity is determined by the NRF entity based on the DN identifier and the DN type.

In a possible design, the communications unit 22 is further configured to: receive a registration request message from the terminal; obtain, from a database based on the registration request message, DN information to which the terminal subscribes, where the subscribed DN information includes a DN identifier and a DN type; and send, to the terminal, the DN information to which the terminal subscribes.

In a possible design, the registration request message includes capability indication information of the terminal, where the capability indication information is used to indicate a data network supported by the terminal. The DN information to which the terminal subscribes corresponds to the data network supported by the terminal.

It should be understood that, the AMF entity or the chip in the AMF entity may be configured to implement steps performed by the AMF entity in the session handling method in the embodiments of the present disclosure. For related features, refer to the foregoing descriptions. Details are not described herein again.

This application further provides a computer-readable storage medium. The computer-readable storage medium stores an instruction, and when the instruction is run on a computer, the computer is enabled to perform operations performed by the terminal in the foregoing session handling method. The computer may be a terminal.

This application further provides a computer-readable storage medium. The computer-readable storage medium stores an instruction, and when the instruction is run on a computer, the computer is enabled to perform operations performed by the SMF entity in the foregoing session handling method. The computer may be an SMF entity.

This application further provides a computer-readable storage medium. The computer-readable storage medium stores an instruction, and when the instruction is run on a computer, the computer is enabled to perform operations performed by the AMF entity in the foregoing session handling method. The computer may be an AMF entity.

This application provides a computer program product. The computer program product includes a computer software instruction, and the computer software instruction may be loaded by a processor to implement a procedure of the session handling method performed by the terminal in any one of the foregoing embodiments.

This application provides a computer program product. The computer program product includes a computer software instruction, and the computer software instruction may be loaded by a processor to implement a procedure of the session handling method performed by the SMF entity in any one of the foregoing embodiments.

This application provides a computer program product. The computer program product includes a computer software instruction, and the computer software instruction may be loaded by a processor to implement a procedure of the session handling method performed by the AMF entity in any one of the foregoing embodiments.

According to the foregoing description of this application, technologies in the art may use or implement the content of this application. Any modification based on the disclosed content shall be considered by those of ordinary in the art to be within the scope of the present disclosure. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A session handling method comprising:
   receiving, by a terminal, a user equipment (UE) route selection policy (URSP) from a network, wherein the URSP comprises: a traffic filter, direct offload information, slice information, continuity types, a data network (DN) identifier, an access type, and a first session type, wherein the traffic filter includes a first application (APP), and wherein the first session type is an Ethernet type;
   initiating, by the terminal, the first APP;
   determining, by the terminal, the Ethernet type associated with the first APP based on the URSP;
   sending, by the terminal, a first message to an access and mobility management function entity, wherein the first message comprises the Ethernet type, and wherein the first message requests to establish a first session of the Ethernet type;
   receiving, by the terminal, a session reject message from a session management function entity, wherein the session reject message comprises a second session type determined by the session management function entity, and wherein the second session type is different from the Ethernet type; and
   sending, by the terminal, a third message to the access and mobility management function entity, wherein the third message comprises the second session type, and wherein the third message requests to establish a second session of the second session type.

2. The session handling method according to claim 1, wherein at least one the first session or the second session is a packet data unit (PDU) session.

3. The session handling method according to claim 1, further comprising:
   determining, by the terminal based on a second correspondence, that the DN identifier corresponds to the first APP;
   determining, by the terminal, a DN type corresponding to the DN identifier; and
   determining, by the terminal based on a third correspondence, the Ethernet type corresponding to the DN type, wherein the second correspondence is between an APP and the DN identifier, and wherein the third correspondence is between the DN type and the first session type.

4. The session handling method according to claim 3, further comprising:
   sending, by the terminal, a request message to the access and mobility management function entity; and
   receiving, by the terminal, the DN identifier and the DN type from the access and mobility management function entity based on the request message.

5. The session handling method according to claim 3, further comprising:
   sending, by the terminal, a request message to the access and mobility management function entity; and
   receiving, by the terminal, the DN identifier and the DN type that are broadcast by a radio access network (RAN) device.

6. The session handling method according to claim 1, further comprising sending, by the terminal, first DN information to the access and mobility management function entity, wherein the first DN information comprises either the DN identifier or the DN identifier and a DN type, and wherein the first DN information is for the access and mobility management function entity to determine the session management function entity based on the DN identifier.

7. The session handling method according to claim 1, wherein the first APP is one of a video application, a text application, or a picture application.

8. The session handling method according to claim 1, wherein sending the first message to the access and mobility management function entity comprises sending, by the terminal, the first message to the access and mobility management function entity via a non-access stratum (NAS) message, wherein the NAS message comprises first DN information for the access and mobility management function entity to determine the session management function entity, and wherein the first DN information comprises at least one of the DN identifier or a DN type.

9. An apparatus comprising:
   a memory storage configured to store instructions; and
   one or more processors in communication with the memory storage and configured to execute the instructions to:
   receive a user equipment (UE) route selection policy (URSP) from a network, wherein the URSP comprises: a traffic filter, direct offload information, slice information, continuity types, a data network (DN) identifier, an access type, and a first session type, wherein the traffic filter includes a first application (APP), and wherein the first session type is an Ethernet type;
   initiate the first APP;
   determine the Ethernet type associated with the first APP based on the URSP;
   send a first message to an access and mobility management function entity, wherein the first message comprises the Ethernet type, and wherein the first message requests to establish a first session of the Ethernet type;
   receive a session reject message from a session management function entity, wherein the session reject message comprises a second session type determined by the session management function entity, and wherein the second session type is different from the first session type; and send a third message to the access and mobility management function entity, wherein the third message comprises the second session type, and wherein the third message requests to establish a second session of the second session type.

10. The apparatus according to claim 9, wherein at least one of the first session or the second session is a packet data unit (PDU) session.

11. The apparatus according to claim 10, wherein the apparatus comprises a terminal, and wherein the terminal is configured to obtain a first correspondence between the first APP and the session type from the access and mobility management function entity.

12. The apparatus according to claim 11, wherein the first APP is a video application.

13. The apparatus according to claim 11, wherein the first APP is a text application.

14. The apparatus according to claim 11, wherein the first APP is a picture application.

15. The apparatus according to claim 9, wherein the one or more processors execute the instructions to:

determine, based on a second correspondence, that the DN identifier corresponds to the first APP;

determine a DN type corresponding to the DN identifier; and determine, based on a third correspondence, the Ethernet type corresponding to the DN type, wherein the second correspondence is between an APP and the DN identifier, and wherein the third correspondence is between the DN type and the first session type.

16. The apparatus according to claim 15, wherein the one or more processors execute the instructions to:

send a request message to the access and mobility management function entity; and receive the DN identifier and the DN type from the access and mobility management function entity based on the request message.

17. The apparatus according to claim 15, wherein the one or more processors execute the instructions to:

send a request message to the access and mobility management function entity; and receive the DN identifier and the DN type that are broadcast by a radio access network (RAN) device.

18. The apparatus according to claim 9, wherein the one or more processors execute the instructions to send first DN information to the access and mobility management function entity, and wherein the first DN information comprises the DN identifier or the DN identifier and a DN type.

19. The apparatus according to claim 18, wherein the first DN information is for the access and mobility management function entity to determine a session management function entity based on the DN identifier, and wherein the session management function entity is configured to establish the session of the Ethernet type.

20. The apparatus according to claim 9, wherein the apparatus is a terminal.

* * * * *